Figure 1:
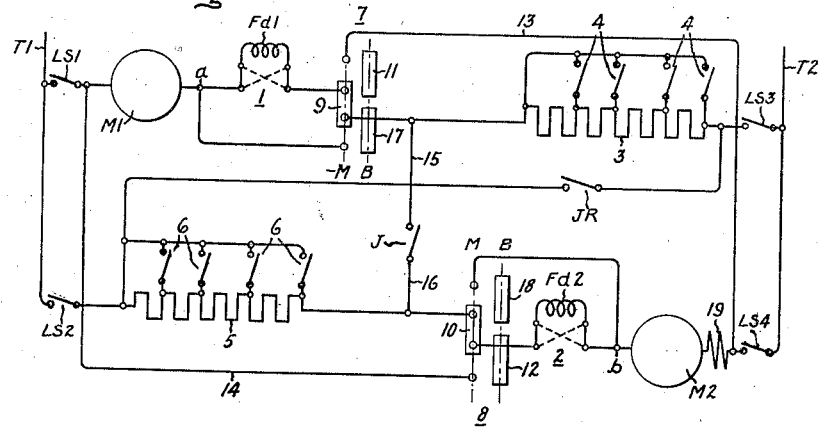

Dec. 6, 1938.                W. T. GRAY                2,139,494
                       ELECTRIC MOTOR CONTROL SYSTEM
                          Filed Oct. 30, 1937

Inventor:
William T. Gray,
by Harry E. Dunham
His Attorney.

Patented Dec. 6, 1938

2,139,494

UNITED STATES PATENT OFFICE 2,139,494

ELECTRIC MOTOR CONTROL SYSTEM

William Train Gray, Altrincham, England, assignor to General Electric Company, a corporation of New York Application October 30, 1937, Serial No. 172,014
In Great Britain October 31, 1936

5 Claims. (Cl. 172—179)

This invention relates to electric motor control systems, especially control systems used on electric railways, and has for its object a simple and reliable system having provisions for dynamic braking.

More particularly, this invention relates to control equipments for electrical power plants comprising two or more electric motors or groups of motors having series field windings, of the kind in which during acceleration the motor armatures or groups of armatures are initially connected in series with one another, and resistance progressively removed from the motor circuit and thereafter some or all the motors or groups of motors are reconnected in parallel with one another with the resistance reinserted and then again progressively reduced, and in which means are provided for establishing a closed circuit about the motors and causing the latter to operate as generators to provide a rheostatic braking when required.

According to the present invention, an equipment of the kind set forth comprises an accelerating resistance associated with each motor or group of motors respectively and switching means for changing from series to parallel operation of the motors or groups in accordance with the "bridge" transition system and for rearranging the connections of the equipment to provide rheostatic braking by connecting the armature or armatures of one motor or group in a closed circuit with the series field winding or windings of another motor or group, the armature or armatures of which is or are connected in a closed circuit with the series field winding or windings of the first motor or motors, which closed circuits are both completed through a common connection through which the currents generated by the two motors or groups flow in the same direction, said common connection including said accelerating resistances connected in series with one another through the connection employed for joining said resistances together during series motoring operation.

With this arrangement, useful control of the braking may be obtained without additional resistances in the closed circuits for dissipating the electrical energy produced by the motors during the rheostatic braking, whilst furthermore the necessary switching means for changing from motoring to braking operation are simple. Thus the switching means controlling the accelerating and transition operations serve to connect the two resistances in series with one another and additional switching means are required only for transferring the connection of each resistance from one side to the other of the field winding or windings of the motor or motors associated with said resistance and for connecting the first sides of said winding or windings with the armature or armatures of the other motor or motors adjacent the line switches associated with said other motor or motors. The line switches remain open during the braking operation, which may be controlled in accordance with a part or the whole of the accelerating sequence by the switch means employed during acceleration. The further switching means above set forth may comprise a simple changeover switch which is not required to break or make current carrying circuits, the establishing of the braking circuit being dependent upon the usual switch joining the two ends of the resistances for the respective motors or groups of motors in series with one another during series motoring operation, which closure may be arranged to be the final operation in the establishment of the braking connections, while said switch is opened before movement of the changeover switch or switches.

The removal of the resistances during braking operation may be effected either manually or automatically as desired in any suitable manner, for example where the equipment provides automatic acceleration such as under control of a current limit switch the automatic accelerating control means, such as a limit switch, may be employed for controlling the removal of the resistances during braking operation if desired. In place of a current limit switch any other suitable form of controlling means may be employed, such as for example an automatic retardation governor device. Conveniently in arrangements as just above set forth the retardation governor may be rendered effective, or the setting of automatic accelerating control means altered, by interlock contacts operated by the switching means for changing the main circuit connections to provide the locking operation.

The invention is eminently, although not exclusively, applicable to equipments employed for electric traction.

If desired, the braking circuits may include additional electrical brakes of any suitable form, for example, eddy current brakes or the like which are included in connections which are only completed when the braking conditions of the equipment have been established. Preferably in the case of traction equipments such eddy current or other electrical brakes are mounted on axles of the vehicle or the like which are not mechanically coupled with the electric motors.

The controller for the braking operation may be arranged for actuation in any suitable manner. For example, said controller may be combined with the master controller governing the power or motoring operation of the equipment so that the braking operation is obtained by movement of the motoring controller handle to further positions providing the braking operation. Alternatively said braking controller may be provided with a separate handle suitably interlocked with the motoring controller so that movement of each of the controllers from the off position is prevented unless the other controller occupies the off position or the braking controller may be mechanically separate from the motoring controller and electrical connection provided between said two controllers so as to prevent the motoring and braking connections being established simultaneously.

Figure 2:
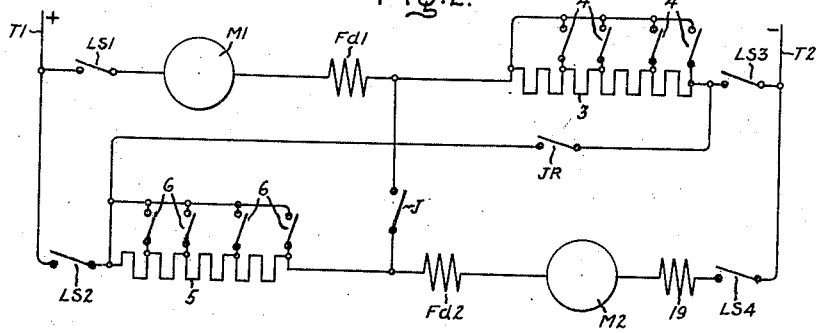
Figure 3:
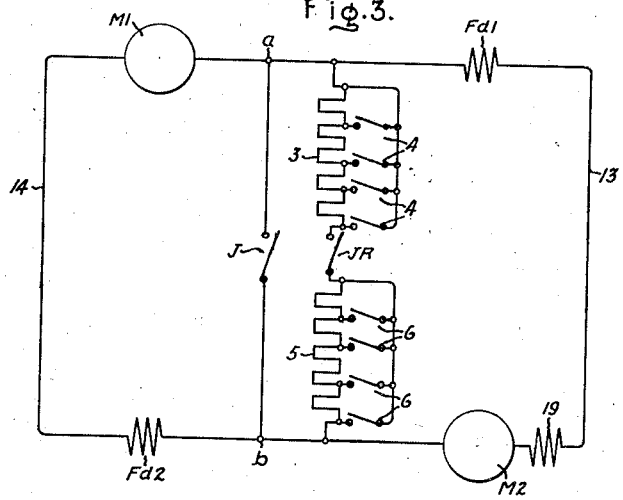

In order that the invention may be clearly understood reference will now be made by way of example to the accompanying drawing, in which:

Fig. 1 is an electrical diagram illustrating one arrangement of the power circuits according to the invention; Fig. 2 is a simplified diagram showing the circuits employed in the arrangement of Fig. 1 for obtaining motoring operations, namely in accordance with the bridge transition system; Fig. 3 is a simplified diagram showing the rearrangement of the circuits of Fig. 1 employed for obtaining braking operation.

Referring first to Fig. 1 of the drawing, the armatures of a pair of motors are indicated at M1 and M2 respectively, each being provided with a series field winding $Fd1$, $Fd2$, which field windings will usually be connected in circuit by way of respective reversing switches indicated diagrammatically at 1 and 2. A sectionalized resistance 3 controlled by switching means 4 is associated with the motor M1 and a sectionalized resistance 5 controlled by switching means 6 is associated with the motor M2. Said switching means are indicated conventionally as contactor type switches, but may be of any suitable form. The equipment is connected with supply conductors T1 and T2 by way of line switches LS1, LS2, LS3 and LS4 and the series connections of the two motors are controlled by a switch JR joining the ends of the resistances remote from the associated motors and a switch J controlling the bridging connection between the junction points of the two motors and associated resistances, said JR and J switches, together with the line switches providing series parallel operation employing the "bridge" transition system as will hereinafter be described. The connections of the resistances 3 and 5 and the motor armatures and series field windings are further controlled by means of motoring-braking changeover switching means indicated by way of example as comprising a pair of drum type throwover switches 7 and 8, although as will be obvious, any other suitable switching means may be employed for this purpose.

The arrangement of said switches 7 and 8 is such that in the motoring positions thereof indicated by the chain lines M, the right-hand end of the field winding $Fd1$ is connected with the left-hand end of the resistance 3 through the contact segment 9, whilst the right-hand end of the resistance 5 is connected with the left-hand end of the field winding $Fd2$ through the contact segments 9 and 10 respectively. Under these conditions the effective circuits of the equipment are as shown in Fig. 2, namely the motor M1, field winding $Fd1$ and resistance 3 are connected in series with one another and this series circuit is adapted to be connected across the supply conductors T1 and T2 by closure of the line switches LS1 and LS3. Similarly, the resistance 5, field winding $Fd2$ and armature M2 are connected in series with one another and this series circuit is adapted to be connected across the supply conductors T1 and T2 by closure of the line switches LS2 and LS4. Further, the right-hand end of the resistance 3 is adapted to be connected with the left-hand end of the resistance 5 by closure of the switch JR and the field windings $Fd1$ and $Fd2$ are adapted to be connected together to place the two motors directly in series with one another by closure of the switch J.

In order to obtain the series motoring conditions, the line switches LS1 and LS4 are closed together with the switch JR, whereby the two motors and the two resistances 3 and 5 are all connected in series with one another across the supply conductors T1 and T2, said resistances being then progressively removed from the motor circuits by sequential operation of the switches 4 and 6, in order to cause acceleration of the equipment. The J switch may then be closed to connect the motors directly in series across the supply conductors and the JR switch may be opened.

In proceeding to parallel operating conditions, with the switch J closed and the switches 4 and 6 reopened, the line switches LS3 and LS4 are closed, whereby the motor armature M1, field winding $Fd1$ and resistance 3 are connected directly across the supply conductors T1 and T2, and the resistance 5, field winding $Fd2$ and armature M2 are similarly connected directly across the said supply conductors. The J switch is then opened to break the bridging connection between the two motor circuits, and the transition from series to parallel conditions thus completed. The resistances 3 to 5 are then again progressively removed from circuit by operation of the switches 4 and 6.

When the motoring-braking switching means 7 and 8 are thrown to the braking position indicated by the chain line B in Fig. 1, the connections of the field windings $Fd1$ and $Fd2$ with the left-hand and right-hand ends respectively of the resistances 3 and 5 are broken and said ends of the field windings are connected by way of the contact segments 11 and 12, and conductors 13 and 14 with the right-hand and left-hand ends of the armatures M2 and M1 respectively. The disconnected ends of the resistances 3 and 5 together with the conductors 15 and 16 of the bridging connection leading to the adjacent sides of the J switch are connected by way of contact segments 17 and 18 of the throwover switches 7 and 8 with the points indicated at $a$ and $b$ between the armature M1 and field winding $Fd1$ on the one hand and the field winding $Fd2$ and the armature M2 on the other hand. Under these conditions the line switches LS1, LS2, LS3 and LS4 remain open and the circuit connections are as shown in Fig. 3. Thus, the armature M1 is connected through the conductor 14 in a closed circuit with field winding $Fd2$ of the other motor, whilst the armature M2 of the latter is connected through the conductor 13 in a closed circuit with the field winding $Fd1$ of the first motor, these two circuits both being closed through a common connection comprising the resistances 3 and 5 and the JR switch, whilst the J switch is also connected across the points $a$ and $b$. The closed circuit of each armature thus includes the field winding of the other motor whereby as is known the motors may be caused to act as generators. Since the circuit of each of the motor armatures is closed through the common connection and this common connection includes in series the resistances 3 and 5 employed for controlling motoring operation, useful control of the braking operation may be obtained without the use of additional resistances in said closed circuit, and as will be apparent only simple switching means are required for changing from motoring to braking operation.

As will be appreciated the magnitude of the electric braking may be controlled by progressive operation of the switches 4 and 6, whilst as a final operation the switch J may be closed.

In the arrangement illustrated the coil of a current limit switch is indicated at 19 in Figs. 1, 2, and 3, this current limit switch being employed for controlling the motoring operation. This coil may be so located in the circuit, as with the arrangement illustrated, that said coil remains connected in circuit with the motor armature M2 during braking operation whereby the current limit switch may be employed to effect automatically the progressive removal of the resistances 3 and 5 as the speed of the equipment falls during braking operation.

This invention may be applied to traction equipment such as described and claimed in my copending application Serial No. 122,286, filed January 25, 1937.

What I claim as new and desire to secure by Letters Patent of the United States, is:

1. The combination with two electric motors, each provided with an armature and a series field winding, of a resistance for each of said motors, switching means for connecting said motors in series with each other and in series with said resistances, means for excluding said resistances to accelerate said motors, switching means for establishing parallel connections for said motors with each of said resistances in circuit with its respective motor, and switching means for connecting each of said armatures in a closed circuit with the field winding of the other armature, said closed circuit being completed by a common connection including said resistances through which the currents generated by the two motors acting as generators for dynamic braking flow in the same direction.

2. The combination with two electric motors, each provided with an armature and a series field winding, of a resistance for each of said motors, switching means for connecting said motors in series with each other and in series with said resistances, means for excluding said resistances to accelerate said motors, a bridging switch for connecting said motors directly in series with each other, switching means for connecting each of said resistances in circuit with its respective motor, whereupon said bridging switch is opened to establish parallel connections for said motors, and switching means for connecting each of said armatures in a closed circuit with the field winding of the other armature, said closed circuit being completed by a common connection including said resistances through which the currents generated by the two motors acting as generators for dynamic braking flow in the same direction.

3. The combination with two electric motors, each provided with an armature and a series field winding, of a resistance for each of said motors, switching means for connecting said motors in series with each other and in series with said resistances, means for excluding said resistances to accelerate said motors, a bridging switch for connecting said motors directly in series with each other, switching means for connecting each of said resistances in circuit with its respective motor, whereupon said bridging switch is opened to establish parallel connections for said motors, and switching means for connecting each of said armatures in a closed circuit with the field winding of the other armature, said closed circuit being completed by a common connection including said resistances through which the currents generated by the two motors acting as generators for dynamic braking flow in the same direction, and current responsive means for controlling the exclusion of said resistances during dynamic braking.

4. The combination with two electric motors, each provided with an armature and a series field winding, of a resistance for each of said motors, switching means for connecting said motors in series with each other and in series with said resistances, said switching means including a series switch directly joining said resistances, means for excluding said resistances to accelerate said motors, a bridging switch for connecting said motors directly in series with each other, switching means for connecting each of said resistances in circuit with its respective motor, whereupon said bridging switch is opened to establish parallel connections for said motors, and switching means for connecting each of said armatures in a closed circuit with the field winding of the other armature, said closed circuit being completed by a common connection through which the currents generated by the two motors acting as generators for dynamic braking flow in the same direction, said common connection including said resistances connected in series with each other through said series switch.

5. The combination with two electric motors, each provided with a series field winding, of a resistance for each of said motors, switching means for connecting said motors in series with each other and in series with said resistances, said switching means including a series switch directly joining said resistances, means for excluding said resistances to accelerate said motors, a bridging switch for connecting said motors directly in series with each other, switching means for connecting each of said resistances in circuit with its respective motor, whereupon said bridging switch is opened to establish parallel connections for said motors, switching means for transferring the connection of each resistance from one side to the other of the field winding of its associated motor and for connecting said one side of each field winding to the armature of the other motor, and switching means for connecting each of said armatures in a closed circuit with the field winding of the other armature, said closed circuit being completed by a common connection through which the currents generated by the two motors acting as generators for dynamic braking flow in the same direction, said common connection including said resistances connected in series with each other through said series switch.

WILLIAM TRAIN GRAY.